United States Patent [19]

Persello et al.

[11] Patent Number: 5,127,952
[45] Date of Patent: Jul. 7, 1992

[54] CORE/OXIDE/DYE PIGMENTARY COLORANTS

[75] Inventors: Jacques Persello, Saint Andre De Corcy; Claude Ceintrey; Michel Sutter, both of Neuville Les Dieppe, all of France

[73] Assignee: Rohne-Poulenc Chimie, Cedex, France

[21] Appl. No.: 530,442

[22] Filed: May 30, 1990

Related U.S. Application Data

[63] Continuation of Ser. No. 106,778, Oct. 13, 1987, abandoned.

[30] Foreign Application Priority Data

Oct. 10, 1986 [FR] France .................. 86 14102

[51] Int. Cl.⁵ .................................. C04B 14/04
[52] U.S. Cl. .................................. 106/492; 106/442; 106/457
[58] Field of Search ............... 106/456, 459, 460, 436, 106/481, 492, 450, 402

[56] References Cited

U.S. PATENT DOCUMENTS

| | | | |
|---|---|---|---|
| 3,054,751 | 9/1962 | Blake et al. | 106/289 |
| 3,477,866 | 11/1969 | Remer | 106/289 |
| 3,716,388 | 2/1973 | Lopez et al. | 106/289 |
| 4,082,905 | 4/1978 | Stephan et al. | 106/308 B |
| 4,084,983 | 4/1978 | Bernhard et al. | 106/289 |
| 4,491,619 | 1/1985 | Biermann et al. | 106/304 |

FOREIGN PATENT DOCUMENTS 0123577 10/1984 European Pat. Off. .
2114991 9/1983 United Kingdom .

OTHER PUBLICATIONS

Chemical Abstracts, vol. 99, No. 10, Abstract No. 72264f, Kubo.
Chemical Abstracts, vol. 100, No. 2, Abstract No. 8582u, (Pental Co. Ltd.).
Chemical Ahbstracts, vol. 93, No. 2, Abstract No. 9623h, Hosoya.
Chemical Abstracts, vol. 6, No. 2, Abstract No. 8210w, (Kubo).
Chemical Abstracts, vol. 99, No. 16, Abstract No. 124156u, (Pentel Co. Ltd.).

*Primary Examiner*—Mark L. Bell
*Assistant Examiner*—Chris Gallo
*Attorney, Agent, or Firm*—Burns, Doane, Swecker & Mathis

[57] ABSTRACT

Novel pigmentary colorants, well adapted for the production of electrostatic developer powders, are comprised of mineral core particulates, at least one mineral oxide and at least one dye, said at least one mineral oxide being deposited onto the surface area of the core particulates, and said at least one dye being absorbed onto the core particulates or onto the at least one mineral oxide and/or being at least partly physically confined within a matrix of the mineral oxide.

31 Claims, 2 Drawing Sheets

FIG. 2

CORE/OXIDE/DYE PIGMENTARY COLORANTS

CROSS-REFERENCE TO COMPANION APPLICATION

This application is a continuation of application Ser. No. 07/106,778, filed Oct. 13, 1987, abandoned.

BACKGROUND OF THE INVENTION

1. Field of the Invention

The present invention relates to colored pigments, particularly magnetic pigments, to processes for their preparation, and to various end applications thereof, notably in the production of developing powders.

2. Description of the Prior Art

It is well known to this art, for numerous applications, to add mineral charges to a wide variety of different materials for purposes of imparting any given number of particular properties thereto. Among the most widely encountered such properties are optical, mechanical and rheological properties. In particular, in the production of developing powders, magnetic pigments constitute a basic element thereof.

For certain applications, it is necessary to incorporate charges in combination with a pigment or dye. In general, these charge/pigment compositions are produced by physically admixing the mineral charge with the dye. However, such process suffers from a number of disadvantages.

A first disadvantage is that it is difficult for a given mineral charge to contain all of the desired coloration. This disadvantage is particularly significant when preparing magnetic pigments for developing powders. Thus, the magnetic particles are based on iron or ferrites, which are very dark colors and which cannot be totally masked by dyes. It is therefore essentially impossible to produce developing powders having a very bright color.

Another disadvantage is linked to the compatibility of the dye with the material intended to be provided with the pigmentation. Consequently, for a given material and as a function of said compatibility, it will only be possible to use a limited number of dyes. In this connection it is also necessary to take account of the dispersibility of said dye in the same material.

Moreover, the resulting colored compositions can display a low resistance to chemical or photochemical deterioration, as well as to abrasion.

SUMMARY OF THE INVENTION

Accordingly, a major object of the present invention is the provision of improved colorants for a given mineral charge which display the complete desired range of colors, which are compatible with a great number of materials and which also exhibit improved mechanical and chemical resistance.

Briefly, the colored pigments according to this invention feature a mineral or inorganic support, at least one oxide and at least one dye, the oxide being present on the surface of the support, and the dye being adsorbed on the support, or on the oxide, and/or incorporated within the oxide itself. By the term "oxide", as utilized herein, are intended not only the oxides, per se, e.g., of titanium, silica, aluminum and zirconium, but also the various hydrates thereof, for example the hydrated oxides of the formula $MO_x\cdot(H_2O)_y$, e.g., $Al_2O_3(H_2O)_y$.

In a preferred embodiment of the invention, the aforementioned oxide is selected from among $TiO_2$, $Al_2O_3$, $SiO_2$, $ZrO_2$, and the various hydrates thereof.

In another embodiment of the invention, the mineral support is based on an element selected from among the mineral oxides or hydroxides, silicates, mineral carbonates, sulfates, sulfides and fluorides.

In another embodiment of the invention, the pigments are magnetic pigments in which the aforementioned mineral support is based on an element selected from among the magnetic metals, their oxides and complexes thereof.

The present invention also features a process for the preparation of the pigments described above, comprising the stages of intimately contacting the support, at least one dye and a precursor of the said oxide, wherein the said oxide and the dye are coprecipitated or crystallized, and separating formed pigment and the liquid phase from the reaction medium.

This invention also features a developing powder comprising a magnetic pigment of the aforementioned type, or a magnetic pigment prepared by the process described above.

DETAILED DESCRIPTION OF THE PREFERRED EMBODIMENTS OF THE INVENTION

More particularly according to the present invention, it will be appreciated that same is applicable to either one or more dyes. Thus, in the description that follows, when reference is made to a single dye it should be understood as applying equally as well to a plurality of dyes.

The essentially novel characteristic of the colored pigments according to the invention is based on their structure, which can be described in the following manner:

The pigment of the invention has a mineral particle or support defining a nucleus and, enveloping said nucleus, a peripheral oxide layer in which the dye is present or incorporated. Obviously this is an ideal case, and all variants with respect to such structure are envisaged. In particular, the peripheral layer coating the particle need be neither continuous, nor homogeneous. The dye can be adsorbed on the support, particularly at locations where the support is not covered with oxide. The dye can also be adsorbed on the oxide. As a result of this structural characteristic, the pigments of the invention present certain advantages.

First, the dyes can totally mask the color of the mineral support, such that it is possible to produce pigments throughout the entire color range. Moreover, as the dyes can be partly incorporated within the deposited oxide mass, the problem of compatibility between the dyes and the materials to be treated is resolved. Finally, for the same reason as hereinbefore, as the dye is protected by an oxide layer, the pigment will be more resistant, especially with respect to the chemical action of the solvents during washing operations.

Their resistance to abrasion will permit the pigments according to the invention to resist the shear forces generated during the working thereof, e.g., during kneading, extrusion or stirring operations.

The different constituent elements of the pigments of the invention will now be described in greater detail.

With regard to the mineral support of the pigments according to the invention, it is possible to use any mineral or inorganic material which can be used as a charge. Representative are mineral oxides or hydroxides useful as charge materials and in particular the oxides of titanium, aluminum, zinc, antimony, zirconium, cerium, lead and magnesium, as well as aluminum hydroxide.

Also representative are the sulfates, including barium, calcium and lead sulfates.

Within the ambit of the invention, other exemplary charges and supports include the sulfides, and in particular zinc sulfide and lithopone, as well as fluorides, such as, e.g., calcium fluoride and the mixed fluoride of sodium and aluminum.

The support can advantageously be selected from among the silicates. Exemplary silicates are those of the kaolin or mica type, silicates of alkaline earth metals, particularly calcium and magnesium, zinc silicates, asbestos, talc, aluminosilicates, in particular of sodium.

With respect to the carbonates, the calcium carbonates are representative, particularly of the calcite, vaterite or aragonite types. Also representative are the magnesium carbonates of the magnesite type and mixed calcium and magnesium carbonates of the dolomite type, barium and lead carbonates.

As hereinbefore mentioned, the invention also features magnetic pigments, for which the mineral particle is based on an element selected from among the magnetic metals, their oxides and complexes. Exemplary in this regard are metals such as iron, chromium, cobalt and nickel. It is also possible to use oxides of these metals, such as $Fe_3O_4$ and $Fe_2O_3$ of the gamma type and ferrites of the formula $MFe_2O_4$, in which M represents a divalent metal such as iron, manganese, nickel or cobalt, or a mixture of metals having a different valence. Finally, also representative are compounds of the formula $R_3Fe_5O_{12}$, in which R represents a rare earth or other trivalent ion, such as, e.g., lithium or scandium, and the iron can be partly replaced by other ions.

It should be noted that in the case of magnetic pigments, the dye:particle weight ratio is preferably at most equal to 10%. This is an important advantage of the pigments according to the invention in the sense that, in the prior art pigments, the quantity of dyes was generally much higher, by approximately 20%.

The second constituent of the pigments according to the invention is the layer-forming or peripheral oxide. This oxide can be any mineral oxide which can be used as a charge material and which can be produced by precipitation or crystallization. Preferably, an oxide of this type is silica, alumina, titanium dioxide, zirconium oxide, and, as heretofore mentioned, the various hydrates thereof.

The third element is the dye. Any type of dye can be used. Obviously, the dyes can be used singly or in combination. The selection thereof is based on criteria well known to this art and as a function of the desired result. Exemplary dyes are as follows. They are arranged in groups. For a given group, each paragraph gives the name of the dye and its number in the Colour Index (C.I.):

| DYES | |
|---|---|
| C. I. No. | C. I. generic name |
| Anthraquinone | |
| 65 300 | Pigment Red 177 |
| — | Pigment Yellow 147 |
| 60 010 | Pigment Violet 31 |
| 60 505 | Solvent Red 111 |
| 61 110 | Solvent Blue 68 |
| 58 840 | Solvent Yellow 163 |
| — | Solvent Blue 132 |
| — | Solvent Blue 122 |
| — | Acid Blue 183 |
| — | Solvent Blue 225 |
| Dioxazine | |
| — | Pigment Violet 37 |
| Flaranthrone | |
| 70 600 | Pigment Yellow 24 |
| Indanthrone | |
| 69 800 | Pigment Blue 60 |
| Quinacridone | |
| 73 900 | Pigment Violet 19 |
| | Pigment Red 202 |
| | Pigment Red 207 |
| Azo condensation | Pigment Yellow 128 |
| | Pigment Yellow 93 |
| | Pigment Yellow 94 |
| | Pigment Yellow 95 |
| | Pigment Orange 31 |
| | Pigment Brown 23 |
| | Pigment Red 166 |
| | Pigment Red 220 |
| | Pigment Red 144 |
| | Pigment Red 248 |
| | Pigment Red 221 |
| Copper-phthalocyanine alpha | |
| 74 160 | Pigment Blue 15 |
| 74 160 | Pigment Blue 15:1 |
| 74 160 | Pigment Blue 15:2 |
| Copper-phthalocyanine beta | |
| 74 160 | Pigment Blue 15:3 |
| 74 160 | Pigment Blue 15:4 |
| Copper-phthalocyanine halogenated | |
| 74 260 | Pigment Green 7 |
| 74 265 | Pigment Green 36 |

| | C. I. No. | C. I. generic name |
|---|---|---|
| Isoindolinone | | |
| Orange 26 | — | Pigment Orange 61 |
| | — | Pigment Yellow 109 |
| | 56 280 | Pigment Yellow 110 |
| Azomethine | | |
| Copper complex | — | Pigment Yellow 129 |
| Nickel complex | — | Pigment Orange 65 |
| Perylene | 71 217 | Pigment Red 224 |
| Arylamide | | |
| Arylamide 106 | 11 710 | Pigment Yellow 3 |
| Arylamide 6 | 11 680 | Pigment Yellow 1 |
| Arylamide | 11 741 | Pigment Yellow 74 |
| Diarylide | | |
| Diarylide anilide | 21 090 | Pigment Yellow 12 |
| Diarylide m-xylidiole | 21 100 | Pigment Yellow 13 |
| Diarylide o-toluidiole | 21 095 | Pigment Yellow 14 |
| Diarylide p-toluidiole | 21 096 | Pigment Yellow 55 |
| Diarylide o-anisidiole | 21 105 | Pigment Yellow 17 |
| Diarylide dimethoxy chloranilide | 21 108 | Pigment Yellow |
| Diarylide pyrazolone | 21 110 | Pigment Orange 13 |
| Diarylide pyrazolone | 21 115 | Pigment Orange 34 |
| Diarylide pyrazolone | 21 120 | Pigment Red 38 |
| Azo dyes | | |
| Azo (Ca) | 13 880 | Pigment Yellow 61 |
| | 13 940 | Pigment Yellow 62:1 |
| Azo (Ba) | 15 602 | Pigment Red 46 |
| Azo 2 B (Ca) | 15 865:2 | Pigment Red 48:2 |

-continued

DYES

| | | |
|---|---|---|
| Azo 2 B (Ba) | 15 865:1 | Pigment Red 48:1 |
| Azo 2 B toner (Sr) | 15 865:3 | Pigment Red 48:3 |
| Azo 2 B toner (Mg) | 15 865:5 | Pigment Red 48:5 |
| Azo 2 B toner (Mn) | 15 865:4 | Pigment Red 48:4 |
| Azo 4 B toner (Ca) | 15 850:1 | Pigment Red 57:1 |
| Azo (Mn) | 15 825:4 | Pigment Red 58:4 |
| Azo | 11 765 | Pigment Yellow 49 |
| | 12 470 | Pigment Orange 22 |
| | — | Pigment Red 222 |
| Dinitralinine orange | 12 075 | Pigment Orange 5 |
| Naphthol | | |
| Naphthol red | 12 085 | Pigment Red 4 |
| Naphthol AS | 12 310 | Pigment Red 2 |
| Naphthol AS | 12 370 | Pigment Red 112 |
| Naphthol AS | 12 355 | Pigment Red 23 |
| Naphthol AS | 12 385 | Pigment Red 12 |
| Naphthol AS | 12 420 | Pigment Red 7 |
| Naphthol AS | 12 490 | Pigment Red 5 |
| Toluidine | | |
| Toluidine red | 12 120 | Pigment Red 3 |
| BON (Mn) | 15 880:2 | Pigment Red 63:2 |
| BON (Mn) | 15 860:2 | Pigment Red 52:2 |
| Lake Red C (Ba) | 15 585:1 | Pigment Red 53:1 |
| Basic dye toner | 45 160:3 | Pigment Red 81:1 |
| | 45 160:2 | Pigment Red 169 |
| | 45 535:2 | Pigment Violet 3 |
| | 42 535:3 | Pigment Violet 27 |
| | 42 595:2 | Pigment Blue 1 |
| | — | Pigment Blue 62 |
| | — | Pigment Green 45 |
| Complex of iron (Na) | 10 006 | Pigment Green 8 |
| Lead sulfochromate | 77 600/ 77 603 | Pigment Yellow 34 |
| Lead chromate | 77 600 | Pigment Yellow 34 |
| Lead sulfochromate molybdate mixture | 77 605 | Pigment Red 104 |
| Metal-free monoazo dye | — | Solvent Yellow 146 |
| Chrome complexes | — | Acid Yellow 118 |
| Chrome complexes | — | Acid Orange 88 |
| Chrome complexes | — | Acid Brown 21 |
| Chrome complexes | — | Acid Red 211 |
| Chrome complexes | — | Acid Black 172 |
| Chrome complexes | 18 690 | Solvent Yellow 21 |
| Chrome complexes | — | Solvent Red 213 |
| Chrome complexes | — | Solvent Red 7 |
| Chrome complexes | — | Solvent Red 214 |
| Chrome complexes | — | Solvent Yellow 88 |
| Chrome complexes | — | Solvent Orange 59 |
| Chrome complexes | — | Solvent Red 130 |
| Cobalt complexes | — | Solvent Yellow 79 |
| Cobalt complexes | — | Solvent Yellow 25 |
| Cobalt complexes | — | Solvent Orange 11 |
| Cobalt complexes | — | Solvent Red 125 |
| Cobalt complexes | — | Solvent Violet 24 |

Also exemplary are nickel complexes and amino complexes of copper, nickel or cobalt.

In general, dyes of the cationic or basic type will advantageously be used in the case where the oxide is silica, whereas those of the anionic or acid type will advantageously be used in the case of alumina.

The process for the preparation of the pigments according to the invention will now be described in greater detail. Such process is essentially based on the coprecipitation of the layer-forming oxide and a dye or pigment. The process for the preparation of the pigmentary material according to this invention consequently comprises intimately contacting the mineral support or particle to be treated, one or more dyes, a precursor of the layer-forming oxide, and then coprecipitating said oxide and the dye.

It will be appreciated that the invention is not limited to any particular precipitation and crystallization process, especially with regard to the precipitation of silica, alumina, titanium dioxide or zirconium oxide. The description of the process given below is thus provided for purposes of illustration only.

The process will be first described in the case where the oxide constituting the peripheral layer is silica. This process can be carried out according to two variants.

In the first variant, the process comprises intimately contacting, mixing and reacting the support, at least one dye, a silicate and an acid, the silica and dye being coprecipitated.

In one embodiment of this variant, the acid and the silicate are simultaneously added to the reaction medium. More specifically, an aqueous suspension of the support is first formed, followed by the simultaneous addition of the acid and an aqueous silicate solution to the reaction medium.

The dye can then be introduced in several ways. It can be present in the suspension of the support, prior to the introduction of the acid and the silicate. It can also be added during the reaction and in such case it can be supplied either separately, or in the form of a solution in silicate.

In a preferred embodiment, it is possible to introduce the acid and the silicate while maintaining constant the pH of the reaction medium. Generally, this pH is fixed at a value ranging from 8 to 9. The reaction temperature can vary widely and typically ranges from 60° C. to 100° C.

Once the reaction has been completed, it is possible to lower the pH of the reaction medium, e.g., to a value of approximately 4. It is also possible to carry out an aging step for a period of time of from, e.g., 30 minutes to 1 hour. The lowering of the pH-value upon completion of the reaction makes it possible to convert the remaining silicate into silica and thus to obtain a particle surface which is not too basic.

A second embodiment of this first variant of the process of the invention comprises initially forming a suspension of the support in an aqueous silicate solution, followed by the introduction of the dye or dyes into the suspension thus formed and the simultaneous or subsequent addition of the acid. The temperature conditions are then identical to those described for the first embodiment. It is obviously also possible to conduct an aging step.

The silicate used is typically an alkaline silicate and more specifically sodium, potassium or lithium silicate.

The acids are conventionally sulfuric, nitric, hydrochloric or a carboxylic acid. The acid is typically used in the form of an aqueous solution.

The separation of the formed pigment and the liquid phase from the reaction medium is carried out in a manner known, per se, and the separated pigment is then dried.

The second variant will now be described, essentially consisting of preparing the silica by hydrolysis of an alkyl silicate. More specifically, the support, at least one dye and an alkyl silicate are intimately contacted, said alkyl silicate is hydrolyzed, and the formed pigment and the liquid phase are separated from the reaction medium.

This route is more particularly described in the article by Stober et al, *Journal of Colloid and Interface Science*, 26, pp. 62–69 (1968), hereby expressly incorporated by reference.

It is generally preferably to carry out the hydrolysis in the presence of a base, which serves as the catalyst.

The procedure is continued by forming a reaction medium by mixing water, alcohol, the support and optionally a base, by then introducing the alkyl silicate, the dye or dyes either being introduced simultaneously, or an already present in the reaction medium prior to the introduction of the alkyl silicate.

Ammonia can be used as the base. The alcohols used are typically aliphatic alcohols. The reaction normally takes place at ambient temperature and the alkyl silicate is preferably introduced with an alcohol. It is also possible to form a sediment based on alcohol, dye and alkyl silicate and then introducing water or a water-base mixture therein. Ethyl silicate is more advantageously used as the alkyl silicate.

As described hereinbefore, the resulting pigment is separated from the reaction medium and then washed, generally with alcohol, followed by drying. In the case where the layer-forming oxide is alumina, several variants can also be envisaged.

In a first variant, the support, at least one dye, an aluminate and an acid are intimately contacted and reacted, the alumina and the dye being coprecipitated.

In one embodiment of this variant, it is possible to simultaneously introduce the aluminate and acid into an aqueous suspension of the support. The dye can be present in a sediment prior to the introduction of the aluminate and the acid. It can also be added during the reaction and, in this case, it can be supplied either separately, or in the form of a solution, to the aluminate.

In this embodiment, it is also possible to carry out the reaction in such manner as to maintain constant the pH of the reaction medium.

In a second embodiment of the first variant, a suspension of the support is first formed in an aluminate solution. The dye is introduced into the suspension and the acid is added simultaneously or subsequently. In general terms, an alkaline aluminate is used and the acid can, e.g., be hydrochloric or nitric acid.

The second variant for the preparation of a pigmentary material according to the invention, with alumina as the layer-forming oxide, comprises intimately contacting, mixing and reacting the support, at least one dye, an aluminum salt and a base, the alumina and dye being coprecipitated.

Obviously, the embodiments described above for the first variant also apply in this case. Thus, it is possible to begin with a sediment constituted by the support suspension or by said suspension in a solution of the aluminum salt, with the simultaneous or separate introduction of the dye, the base, or, if appropriate, the salt.

The base is typically soda or ammonia and the aluminum salt can, e.g., be an aluminum halide, such as aluminum chloride or an aluminum nitrate.

Finally, in a third variant, it is possible to prepare the colored pigments based on alumina by hydrolysis of an aluminum alkoxide. This variant is similar to that described above for the hydrolysis of an alkyl silicate. The support, at least one dye and an aluminum alkoxide are intimately contacted, the alkoxide is hydrolyzed and the pigment formed and the liquid phase are separated from the reaction medium.

The earlier description in the case of the hydrolysis of an alkyl silicate applies equally here, particularly with respect to the use of a base and the method of introducing the reagents.

The alkoxide can be the methylate, ethylate, isopropylate or butylate of aluminum, said alkoxides being in liquid or solid form in dispersion or in solution in an organic solvent, e.g., the corresponding alcohol or benzene.

In the case of the preparation of colored pigments incorporating titanium dioxide as the layer-forming oxide, different techniques are applicable. The first comprises intimately contacting the support, at least one dye and a titanium (IV) salt, hydrolyzing said salt and separating the thus formed pigment and the liquid phase from the reaction medium. More specifically, said hydrolysis can be carried out on sulfuric solutions of titanium (IV) sulfate. After evaporation with a view to providing a concentrated solution, these solutions are mixed with hot water at a temperature of approximately 95° C. The mixture is maintained boiling and in this manner a precipitate is collected. In such a case, the dye is present from the outset in the titanium (IV) sulfate solution.

Another method comprises hydrolyzing $TiCl_4$ by addition of ammonia. The dye can be present in the $TiCl_4$ starting solution.

Another method comprises hydrolyzing an alkyl titanate. This method is of the same type as that described above for the hydrolysis of an alkyl silicate. The support, at least one dye and an alkyl titanate are intimately contacted, followed by the hydrolysis of the alkyl titanate and the separation of the pigment formed and the liquid phase from the reaction medium. The earlier description in connection with the method of introducing the reagents also applies here.

Moreover, as regards pigments having titanium dioxide as the layer-forming oxide, another method comprises pretreating the support in such manner as to deposit silica or alumina by precipitation. This process is especially applicable for the production of magnetic pigments.

First, silica or alumina is precipitated on the support by the type of process described hereinbefore. Secondly, the thus treated support is intimately contacted with the $TiO_2$ precursor and the dye, and the latter two elements are precipitated in the manner described above for the preparation of pigments with $TiO_2$ as the layer-forming oxide.

As regards the preparation of colored pigments incorporating zirconium oxide as the layer-forming oxide, such preparations are of the same type as described above for titanium dioxide.

It will also be appreciated that it is well within the scope of the invention to produce pigments comprising several layer-forming oxides.

It is also possible to effect a pretreatment of the mineral support by forming thereon a metal complex, e.g., based on nickel, copper, cobalt or manganese. This complex can be generally produced by the action of a metal salt, e.g., chloride, and an amine or an amine derivative in the presence of the support. For example, amino alcohols and alkyl amines are thus suitable. The support which has been subjected to this pretreatment is then treated according to the invention, such as described above.

In the same fashion, the support can be pretreated by the formation thereon of a metal oxide of the chromium, nickel or cobalt oxide type. Such a pretreatment serves to more strongly mask the support, which can be of interest in the case of highly colored supports, e.g., of the iron oxide type.

This pretreatment can be carried out by precipitation onto the support of a metal salt, optionally followed by a heat treatment.

The pigments according to the invention have numerous applications in all fields entailing the use of colored charges. For example, they can be used in the preparation of cosmetics, detergent compositions and glues. A particularly interesting application of the magnetic pigments is the use thereof in the production of developing powders (toners).

These powders generally incorporate magnetic particles, one or more binders, dyes and various additives, such as fillers, coupling agents, conductivity agents, metal soaps or lubricants, as well as fluidity agents. Examples of suitable binders are polystyrene, polyvinyl chloride, polyacrylates, polymethacrylates, polyester resins, polyamides, epoxy resins, acrylic styrenes, styrenebutadienes, as well as natural or synthetic waxes. In general, the quantity of dyes is high and can represent approximately 20% by weight of the overall powder.

These powders are prepared by various processes, such as, e.g., atomization, encapsulation, or dry processing. The most widely used production process is the dry route. It includes the following steps:
(i) Dry mixing of the constituents;
(ii) Dispersion of the oxides in the melted medium by extrusion-kneading, using extruders, internal mixers or roll mixers, or kneaders;
(iii) Cooling and crushing the product;
(iv) Coarse grinding (mechanical grinders);
(v) Fine grinding (air jet grinders);
(vi) Selection of particles;
(vii) Optional surface treatment; and
(viii) Addition of additives.

The pigments of the invention have various advantages in the production of developing powders. First, the process for the production of a colored developing powder is very simple, because it is only necessary to substitute the conventional pigment by a treated pigment. It will be appreciated that the use of the pigments of the invention entails no modifications with regard to the remainder of the formulation of the powders, particularly for the various binders and additives referred to above.

In a preferred embodiment of the invention, it is possible to add to the developing powder composition a supplementary dye apart from that present in the pigment treated according to the invention. This dye, which constitutes at most 5% by weight of the developing powder, makes it possible to modify the color obtained. For this purpose, it is possible to use any appropriate dye referred to above.

It is also possible to introduce titanium oxide into the composition of the powders, which makes it possible to obtain more luminous shades.

The content of magnetic particles can represent 10 to 90% by weight of the powder, such content being dependent on the use for which the powder is intended.

The content of magnetic particles can represent 10 to 90% by weight of the powder, such content being dependent on the use for which the powder is intended.

Moreover, the pigmentary material of the invention permits the use of conventional magnetic pigments. They also enable provision of a wider range of colors, because the treatment masks the initial color of the magnetic pigment. It should also be noted that the final colors are purer and more saturated than those realized by simply mixing a dye with a conventional magnetic pigment.

Finally, developing powders based on pigments according to the invention have a favorable price compared with those of the prior art, which is due to the use of a smaller amount of dye and an inexpensive pigment treatment.

In order to further illustrate the present invention and the advantages thereof, the following specific examples are given, it being understood that same are intended only as illustrative.

EXAMPLE 1

Preparation of a yellow titanium oxide by the coprecipitation of $SiO_2$

Into a 4.5 liter, sheathed polypropylene, double envelope, stainless steel reactor with 3 counter-blades, 1 agitator with 4 blades having a diameter of 85 mm and which was covered with silicone, 3000 $cm^3$ of a 300 g/l $TiO_2$ mix previously ground with OTTAWA sand in the presence of 72 $cm^3$ of a 3.4 molar ratio to 100 g/l sodium silicate, were introduced. The $TiO_2$ suspension was heated to 96° C. with the aid of the double envelope and a 500 w heating candle. At this temperature, 9 g of Ciba B3R IRGALITHE yellow dye were introduced. Stirring was maintained at 850 r.p.m. during the following reaction:

The silica was precipitated by the introduction, with the aid of pumps and for 2 hours at 4.5 $cm^3$/min, of 1.57% sulfuric acid and sodium silicate, in a molar ratio $SiO_2/Na_2O$ of 3.5 to 3.85%. The pH decreased from 10.3 to 9 upon completion of the reaction.

The colored suspension was then diluted in its same volume, the following operations then being carried out:

(a) the decanted matter was taken up with 3 liters of water,
(b) the decanted matter, adjusted to a pH of 6.5 in 1000 cm3 of acidulated water, was taken up,
(c) the washed decanted matter was taken up with 3 liters of distilled water.

This was followed by filtration and drying at 120° C. of the 1352 g of filter cake giving 720 g of dry final product.

EXAMPLE 2

Preparation of Green Gamma Iron Oxide $Fe_2O_3$ by Coprecipitation of $SiO_2$

Into a 5 liter stainless steel reactor, 3000 $cm^3$ of soft water, 500 g of pulverulent gamma $Fe_2O_3$ and 1000 $cm^3$ of a sodium silicate, at a molar ratio of 3.5 (7% in $SiO_2$), were successively introduced. The mixture was heated to 75° C., accompanied by vigorous stirring, the pH being 10.2 at this temperature.

This was followed by the introduction of 25 g of a Ciba blue G.E. dye (dry extract value). After homogenizing the suspension, 5% sulfuric acid was introduced using a pump, at a rate of 30 $cm^3$/min, in order to adjust the pH to 7 for 21 minutes. The temperature of 75° C. was maintained for 30 minutes following the total introduction of the sulfuric acid.

The product was then filtered on a Büchner filter and on paper and washed with twice its volume of $H_2SO_4$-acidified water and at a pH of 3.5. After drying to 110° C. for 15 hours, 560 g of a green magnetic powder were obtained.

EXAMPLE 3

Preparation of a Green Gamma Iron Oxide $Fe_2O_3$ by Coprecipitation of $SiO_2$

Into a 5 liter stainless steel reactor, 3000 cm$^3$ of soft water and 500 g of pulverulent gamma $Fe_2O_3$ were successively introduced. The mixture was heated to 75° C. under vigorous stirring and the pH was 8 at this temperature. 25 g of Ciba blue G.E. dye (dry value) were then introduced into the sediment.

After dispersion in the suspension, 1000 cm$^3$ of sodium silicate, in a molar ratio 3.5 to 7% in $SiO_2$, and at a rate of 50 cm3/min, and 54% sulfuric acid, were simultaneously added. The pH was regulated to 8.5, which represented 620 cm$^3$ of added sulfuric acid. The pH was then adjusted to 7. The temperature of 75° C. was maintained for 30 minutes upon completion of the $H_2SO_4$ introduction.

The product was then filtered on a Büchner filter using fast paper. It was washed using twice its volume of $H_2SO_4$-acidified soft water at pH 3.5. After drying in an oven at 110° C. for 15 hours, 560 g of a green magnetic powder were obtained.

EXAMPLE 4

Preparation of a Red Gamma Iron Oxide $Fe_2O_3$ by $SiO_2$ Coprecipitation

Into a 4 liter stainless steel reactor, equipped with a pH and temperature regulating system, 1350 g of deionized water, 850 cm$^3$ of sodium silicate, constituting 780 g in $SiO_2$ and having a $SiO_2/Na_2O$ molar ratio of 3.4, and 400 g of gamma iron oxide (Bayer type 8200), were successively introduced, at ambient temperature.

The reaction mixture thus obtained was stirred at 1100 r.p.m. using mechanical stirring (4 blade turbine) until homogenization was attained (approximately 1 hour). This was followed by the progressive addition, under stirring, of 67 g of dye (Ciba Geigy IRGALITHE 4 BP red), with the addition lasting approximately 5 minutes. The mixture thus obtained was heated to 70° C. and, in the sequence of tests, the temperature was regulated to 70°±5° C. and the stirring was maintained at 1100 r.p.m.

This was followed by the progressive addition (Watson Marlow 501 peristaltic pump), and at a constant flow rate equal to 1.24 ml/min, of 56 ml of an aqueous sulfuric acid solution having a gravimetric titer equal to 9% (addition lasting 45 minutes). During the acid addition, the pH of the mixture decreased from 11.3 to 7.5. The mixture was permitted to age for 30 minutes at pH 7.5, at 75° C. and under stirring.

After cooling, the product was filtered on a Büchner filter and a Whatmann No. 4 filter, following by washing with deionized water until a wash water was obtained having a conductivity equal to that of the deionized water. The recovered solid material was dried in an oven at 130° C. for 12 hours.

The solid obtained was a red gamma iron oxide, covered with silica. The dye was included in the deposited silica mass and was not absorbed by washing with water or acetone.

Chemical analysis of the solid product: $SiO_2$: 40 mass %, Dye: 8 mass %.

EXAMPLE 5

Preparation of a Red Gamma Iron Oxide $Fe_2O_3$ by $SiO_2$ Coprecipitation

The procedure of Example 4 was repeated, but using 67 g of red dye (Bayer Bayplast) dissolved in 100 ml of propanol. The product obtained was identical to that of Example 4.

EXAMPLE 6

Preparation of Blue Gamma Iron Oxide $Fe_2O_3$ by Coprecipitation of $SiO_2$ and $Al_2O_3$ Into a 250 cm$^3$ stainless steel reactor stirred by a 4-blade turbine rotating at 1100 r.p.m., 100 cm$^3$ of soft water and 21 g of gamma $Fe_2O_3$, were introduced. The mixture was adjusted to pH 8 by 5% NaOH and then 1.1 g of G.E. blue was added.

The stirred suspension was heated to 95° C. and maintained at pH 8 by the simultaneous addition of sodium silicate, at a molar ratio of 3.4 (7% in $SiO_2$), and 3% $H_2SO_4$ (15 cm$^3$ of sodium silicate). The mixture was adjusted to 35° C. and pH 2.5 by the introduction of 18 $H_2O$ alumina sulfate (0.45 g of $Na_2SO_4$ 18 $H_2O$ in 4.65 cm$^3$ of $H_2O$) and 3% $H_2SO_4$.

By the addition of sodium aluminate in solution (0.57 g of $Al_2O_3$ in 2.03 cm$^3$ of $H_2O$) and 6.1 cm$^3$ of $H_2O$, the pH was adjusted to 11. The suspension was heated at 70° C. for 30 minutes. By adding 3% $H_2SO_4$, the pH of the suspension was decreased to 7.

The mixture was filtered hot on a Büchner filter using a fast paper and was washed with soft water.

The product was dried in an oven at 130° C. for 15 hours and the ground product had a green color.

EXAMPLE 7

Preparation of Blue Gamma $Fe_2O_3$ by $Al_2O_3$ Coprecipitation

Into a 1 liter reactor, under stirring at 900 r.p.m., 583 cm$^3$ of soft water and 175 g of pulverulent gamma $Fe_2O_3$ were introduced. It was adjusted to a pH of 2.5 using an aluminum sulfate solution ($Al_2(SO_4)_3.18 H_2O$ 7 g and 72 cm$^3$ of soft water) and 3% $H_2SO_4$. This was followed by the addition of 1.75 g of UNISPERSE G.E. blue dye. This was in turn followed by the progressive introduction of sodium aluminate in solution (10.5 g of $Al_2O_3$ for 36 cm$^3$ of $H_2O$) and 93 g of $H_2O$, to adjust the pH to 11. The mixture was then heated to 70° C. for 45 minutes. The pH was decreased to 7 by adding 5% $H_2SO_4$.

The mixture was filtered hot on a Büchner filter using a fast paper, and washing was carried out with soft water. The product was dried in an oven at 120° C. for 15 hours, and the ground product had a green color.

EXAMPLE 8

Preparation of a Blue $TiO_2$ Pigment by $Al_2O_3$ Coprecipitation

Into a 1 liter reactor, 500 cm$^3$ of soft water and 150 g of rutile $TiO_2$ were introduced, under stirring, using a 4-blade turbine at 900 r.p.m. The suspension was adjusted to pH 2.5 using an 18 $H_2O$ aluminum sulfate solution (6 g in 62 cm$^3$ of $H_2O$) and by 3% $H_2SO_4$.

This was followed by the introduction of 1.5 g of mordant blue 3 No. C.I. 43 820 and a sodium aluminate solution (9 g of $Al_2O_3$ in 32 cm$^3$ of $H_2O$) and 78 cm$^3$ of $H_2O$ to adjust the pH to 11. The mixture was then heated to 70° C. for 1 hour, after which the pH was decreased to 7 by 3% $H_2SO_4$. The mixture was then hot filtered on a Büchner filter using fast filter paper. A washing was carried out using soft water. The product was dried in an oven at 130° C. for 15 hours and has a blue coloring after grinding.

EXAMPLE 9

Preparation of Blue Silica Pigment by $Al_2O_3$ Coprecipitation

Into a 1 liter reactor, 650 cm$^3$ of soft water and 97.5 g of ZEOSIL 175 silica were introduced, under stirring, using a 4-blade turbine rotating at 1000 r.p.m. To adjust the suspension to pH 2.5, an aluminum sulfate solution was introduced, comprising 4.5 g of aluminum sulfate.18 $H_2O$ in 46.5 cm$^3$ of soft water.

This was followed by the introduction of 1 g of mordant blue 3 and the progressive addition of a sodium aluminate solution (5.7 g in $Al_2O_3$ for 20.3 cm$^3$ of soft water) and 61 g of soft water. Heating was carried out for 45 minutes at 70° C. at a pH of 11 and then 5% $H_2SO_4$ was used to adjust the pH to 7.

Hot filtration was carried out on a Büchner filter using fast paper. The cake was dried in an oven at 120° C. for 15 hours and ground, thus providing a blue powder.

EXAMPLE 10

Preparation of a Cerium Oxide Pigment by $SiO_2$ Coprecipitation

Into a 1 liter steel reactor, 650 cm$^3$ of soft water and 130 g of $CeO_2$ were introduced. Under stirring by means of a 4-blade turbine rotating at 800 r.p.m., the mixture was heated to 95° C. At this temperature, 1.5 g of G.E. blue, sodium silicate in a molar ratio of 3.4 (7% in $SiO_2$) and 5% $H_2SO_4$ were simultaneously introduced at a rate of 1.5 cm3/min (silicate) by regulating the pH to 8.5. After 1 hour, the pH of the medium was adjusted to 7 with 5% $H_2SO_4$. The mixture was hot filtered on a Büchner filter using fast filter paper. A washing was then carried out using soft water. The product was placed in an oven at 130° C. for 15 hours and was then ground.

EXAMPLE 11

Preparation of a $TiO_2$ Blue Pigment by Hydrolysis of an Ethyl Silicate

Into a 250 cm$^3$ stainless steel reactor and under vigorous agitation (900 r.p.m. using a 4-blade turbine), the following materials were introduced:

| | | |
|---|---|---|
| (i) Ethyl alcohol | 165 g | |
| (ii) $NH_4OH$ (244 g/l in $NH_3$) | 9.3 g | |
| (iii) Soft water | 4.85 g | |
| (iv) Rutile $TiO_2$ | 12 g | |
| (v) G. E. blue dye | 0.24 g | |

This was followed by the introduction of a mixture of ethyl silicate and ethanol, i.e., 68 g at 14.7% in $SiO_2$ at a rate of 1.8 cm$^3$/min. This addition lasted for 35 minutes at ambient temperature and filtration was then carried out on a Büchner filter using fast paper. A washing was then conducted, first with ethanol and then with soft water. The cake was dried at 120° C. for 15 minutes in a ventilated oven. The product was then ground.

EXAMPLE 12

Preparation of a Gamma $Fe_2O_3$ Pigment by Coprecipitation of $TiO_2$ and Pretreatment by $SiO_2$ The pretreatment utilizing gamma $Fe_2O_3$ consisted of precipitating 5 to 10% $SiO_2$ by means of dilute sodium silicate and dilute sulfuric acid. The dried, ground product was taken up by a further isopropyl titanate treatment, using a dye, and providing a $TiO_2$ + dye deposit.

The reagents used were a $SiO_2$-pretreated gamma $Fe_2O_3$ suspension of 140 g/l in $Fe_2O_3$, i.e., 70 g for 540 mg of mixture; 28% isopropyl titanate in $TiO_2$, i.e., 25 cm$^3$; and 14 g of Ciba Geigy IRGALITE red dye.

Into a 1 liter stainless steel reactor, the $SiO_2$pretreated gamma $Fe_2O_3$ suspension was maintained, under vigorous stirring at 1100 r.p.m. using a 4-blade turbine. Progressively, over 10 minutes, 25 cm$^3$ of isopropyl titanate were introduced, followed by the IRGALITE red dye.

The reactor was heated for 45 minutes at 60° C. The mixture was filtered on a Büchner filter using fast paper. The cake was then washed with soft water. The product obtained was dried in an oven at 110° C. for 15 hours, giving a red ground product.

EXAMPLE 13

Preparation of a Calcium Carbonate Pigment by $SiO_2$ Coprecipitation

A calcium carbonate suspension was prepared using an ULTRA-TURAX dispenser for 5 minutes at average speed. 120 cm$^3$ of soft water, 20 cm$^3$ of sodium silicate, at a molar ratio of 3.4 (7% in $SiO_2$), and 16 g of pulverulent calcium carbonate, were introduced.

The mixture, stirred in a 250 cm$^3$ stainless steel reactor, was supplied with 0.7 g of Ciba Geigy UNISPERSE G.E. green and heated to 75° C. at pH 9.9. This was followed by the progressive addition of 5% $H_2SO_4$ at a rate of 1.3 cm$^3$/minute for 9 minutes, 20 seconds, up to a pH of 6.

The mixture at 75° C. was stirred for 30 minutes to ensure stabilization, the pH then being 7.4. The cake was washed with soft water, the product was dried in an oven at 110° C. for 15 hours, and a green powder was obtained after grinding.

EXAMPLE 14

Preparation of a Talc Pigment by $SiO_2$ Coprecipitation

A talc suspension was prepared using an ULTRA-TURAX disperser at average speed. 120 cm$^3$ of soft water, 20 cm$^3$ of sodium silicate, at a molar ratio of 3.4 (7% in $SiO_2$), and 16 g of talc, were successively introduced into a 250 cm$^3$ stainless steel reactor.

The mixture was stirred at 1100 r.p.m. in a stainless steel reactor using a 4-blade turbine and heated to 75° C. 0.6 g of Ciba Geigy UNISPERSE G.E. green was then introduced and the pH changed to 10.2. The silica was progressively formed by the addition of 5% $H_2SO_4$ in 15 minutes to pH 6. The mixture was permitted to stabilize at 75° C. for 30 minutes, the final pH being 7.4.

Filtration was carried out on a Büchner filter and with fast paper. Washing was carried out using soft water and then with acidulated water ($H_2SO_4$—pH 3.5). The product was dried at 110° C. in an oven for 15 hours. On grinding, it had an attractive green color.

EXAMPLE 15

Preparation of a Kaolinite Pigment by $SiO_2$ Coprecipitation

A kaolinite suspension was prepared using an ULTRA-TURAX disperser at average speed. 240 cm³ of soft water, 40 cm³ of sodium silicate, at a molar ratio of 3.4 (7% in $SiO_2$), and 32 g of kaolinite (TRANSLINK), were introduced.

0.6 g of Ciba Geigy UNISPERSE G.E. green was added to the mixture in a 500 cm³ stainless steel reactor. Under stirring using a 4-blade turbine, the mixture was heated to 75° C., producing a pH of 9.8.

By the progressive addition of 5% $H_2SO_4$ at a rate of 2.7 cm³/minute, neutralization and formation of $SiO_2$ occurred for 13 minutes. A pH of 6.5 was obtained and the mixture was stabilized for 30 minutes at 75° C.

Filtration was carried out on fast paper. The washing was done with soft water. Drying was carried out in an oven at 110° C. for 15 hours and the ground product was light green.

EXAMPLE 16

Preparation of an $Al_2O_3$ Pigment by $SiO_2$ Coprecipitation 120 cm³ of soft water, 20 cm³ of sodium silicate, at a molar ratio of 3.4 (7% in $SiO_2$), and 24 g of trihydrated $Al_2O_3$, were successively introduced into a 400 cm³ beaker. The mixture was stirred for 5 minutes by means of an ULTRA-TURAX stirrer.

The homogeneous mixture was transferred into a 250 cm³ stainless steel reactor, under stirring using a 30 mm diameter 4-blade turbine. Under stirring at 1100 r.p.m., the Ciba Geigy UNISPERSE G.E. green dye was introduced in an amount of 0.6 g. Introduced into the mixture, heated to 75° C. at a pH of 10.2, was 5% $H_2SO_4$ at a rate of 1.35 cm³/min for 12 minutes, 15 seconds. The pH was 6. Stabilization was effected for 30 minutes at 75° C.

The product was hot filtered on a Büchner filter and with fast paper. Successive washing operations were carried out with acidulated water ($H_2SO_4$—pH 3.5). The filtered product was dried in an oven at 110° C. for 15 hours and then ground. It then had an attractive green coloration.

EXAMPLE 17

This example illustrates the solvent coloring behavior of colored pigments according to the invention. A 50 cm³ hermetically sealed tube was used, in which were placed 1 g of pigment to be tested and 20 g of solvent, which was water, methanol (MeOH) or heptane ($C_7$). The mixture was homogenized by placing the tube into a TURBULA stirrer for 2 hours. Sedimentation was then observed after 1 hour.

The results are reported in the following Table I. The pigments referred to in the previous examples are given. It will be seen that, in all cases, the dyes of the pigments according to the invention were not eliminated by washing with water, methanol and heptane.

TABLE I

| Pigment | Solvent | | |
| --- | --- | --- | --- |
| | $H_2O$ | MeOH | $C_7$ |
| Example 6 | Colorless | Colorless | Colorless |
| Example 7 | Colorless | Colorless | Colorless |
| Example 8 | Colorless | Colorless | Colorless |

TABLE I-continued

| Pigment | Solvent | | |
| --- | --- | --- | --- |
| | $H_2O$ | MeOH | $C_7$ |
| Example 13 | Colorless | Colorless | Colorless |
| Example 15 | Colorless | Colorless | Colorless |

COMPARATIVE EXAMPLE 18

Two pigments were prepared according to a prior art process, i.e., by simple physical admixing of the constituents.

Pigment A was produced by mixing 80% by weight of gamma $Fe_2O_3$, 10% of silica and 10% of G.E. blue dye.

Pigment B was produced by mixing 55% by weight of gamma $Fe_2O_3$, 20% of $TiP_2$ and 25% of a G.E. blue dye.

The test described in Example 17 was then carried out. In all cases, no matter what the sedimentation time and even after centrifuging, significant coloration occurred in each solvent.

EXAMPLE 19

This example illustrates the preparation of magnetic developing powders from pigments according to the invention. The basic pigment used was treated magnetic oxide having a red color according to Example 4.

Different powder samples were prepared by varying the proportions according to the general formula:

| | |
| --- | --- |
| Treated magnetic oxide | 45% |
| Acrylic resin | 55 to 40% |
| Additional dye | 0 to 5% |
| Titanium dioxide | 0 to 10%. |

The general operating procedure was as follows. The different starting materials were mixed dry. The mixture was then hot extruded, cooled and crushed. The product was then finely ground with an air jet grinder and then selected, in order to retain a powder having an average diameter of approximately 20 μm.

Images are produced on a photocopier with the formation of flat tints, the color points of which being measured using an ELREPHO-type reflection colorimeter. The results are reported in Table II:

TABLE II

| Powder No. | Composition | | Appearance | Color Point |
| --- | --- | --- | --- | --- |
| 1 | 45% | magnetic oxide | Brick red | $X_D = 0.51$ |
| | 0% | dye | | $Y_D = 0.30$ |
| | 0% | titanium dioxide | | $Z_D = 0.19$ |
| | 55% | resin | | |
| 2 | 45% | magnetic oxide | Bright | $X_D = 0.505$ |
| | 0% | dye | brick red | $Y_D = 0.300$ |
| | 10% | titanium dioxide | | $Z_D = 0.195$ |
| | 45% | resin | | |
| 3 | 45% | magnetic oxide | Bright | $X_D = 0.49$ |
| | 5% | Irgalite red dye | carmine red | $Y_D = 0.30$ |
| | 10% | titanium dioxide | | $Z_D = 0.21$ |
| | 40% | resin | | |
| 4 | 45% | magnetic oxide | Bright | $X_D = 0.495$ |
| | 2.5% | Bayplast red dye | vermilion red | $Y_D = 0.305$ |
| | 10% | titanium dioxide | | $Z_D = 0.2$ |
| | 42.5% | resin | | |

It will be seen that the additional amount of dye is very small and made it possible to modify the color obtained as a result of the masking effect of the surface treatment of the starting magnetic pigment. Moreover, the addition of titanium dioxide made it possible to obtain more luminous shades, which can also be obtained through the surface treatment of the magnetic pigment.

COMPARATIVE EXAMPLE 20

Utilizing the same procedure as above, a powder having the following composition was prepared (powder 5):

| | | |
|---|---|---|
| (i) | Gamma magnetic oxide Fe$_2$O$_3$ (Bayer AC 8200) | 30% |
| (ii) | Red dye (Ciba Irgalithe) | 20% |
| (iii) | Titanium dioxide RL 11 A (Thann and Mulhouse) | 20% |
| (iv) | Acrylic resin (Polyvinyl Chemie Neocryl A) | 30% |

Figure 1:
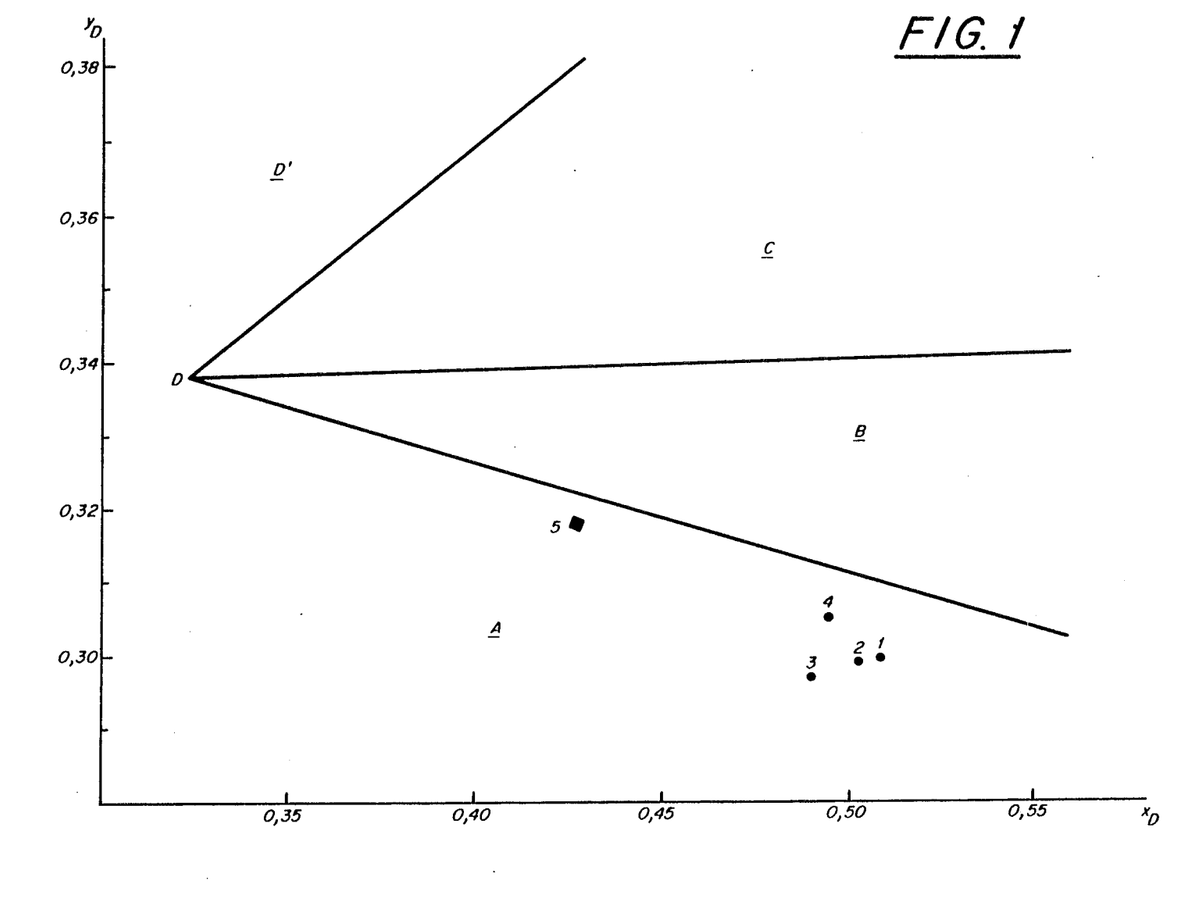
FIG. 1 is a graph plotting the measurement of color points of developing powders based on red pigments according to the invention and a powder according to the prior art.

It had a dark winy red appearance and the color point was as follows:
$X_D = 0.43$
$Y_D = 0.318$
$Z_D = 0.252$ The color points of the different red toners are shown in FIG. 1 of the attached figures of drawing which reveals the advantage of the preparative process based on surface-treated magnetic pigments according to the invention. Zones A, B, C and D' respectively correspond to the shades carmine, red, vermilion and orange.

EXAMPLE 21

The treated magnetic pigment used was the product of Example 2. The operating procedure was identical to Example 19. The products and results are reported in the following Table III:

TABLE III

| Powder No. | Composition | Appearance | Color Point |
|---|---|---|---|
| 6 | 45% magnetic oxide<br>0% additional dye<br>0% titanium dioxide<br>55% resin | Bright dark green | $X_D = 0.31$<br>$Y_D = 0.37$<br>$Y_D = 0.32$ |
| 7 | 45% magnetic oxide<br>5% Bayer N 206 green dye<br>50% resin | Bright green | $X_D = 0.30$<br>$Y_D = 0.42$<br>$Z_D = 0.28$ |
| 8 | 45% magnetic oxide<br>5% Bayer green dye<br>10% titanium dioxide<br>40% resin | More saturated bright light green | $X_D = 0.29$<br>$Y_D = 0.38$<br>$Z_D = 0.33$ |

COMPARATIVE EXAMPLE 22

Following the above procedure, a powder having the following composition was prepared (powder 9):

| | | |
|---|---|---|
| (i) | Gamma magnetic oxide Fe$_2$O$_3$ (Bayer 8200) | 40% |
| (ii) | Bayer H 206 green dye | 10% |
| (iii) | Acrylic resin | 50% |

Figure 2:
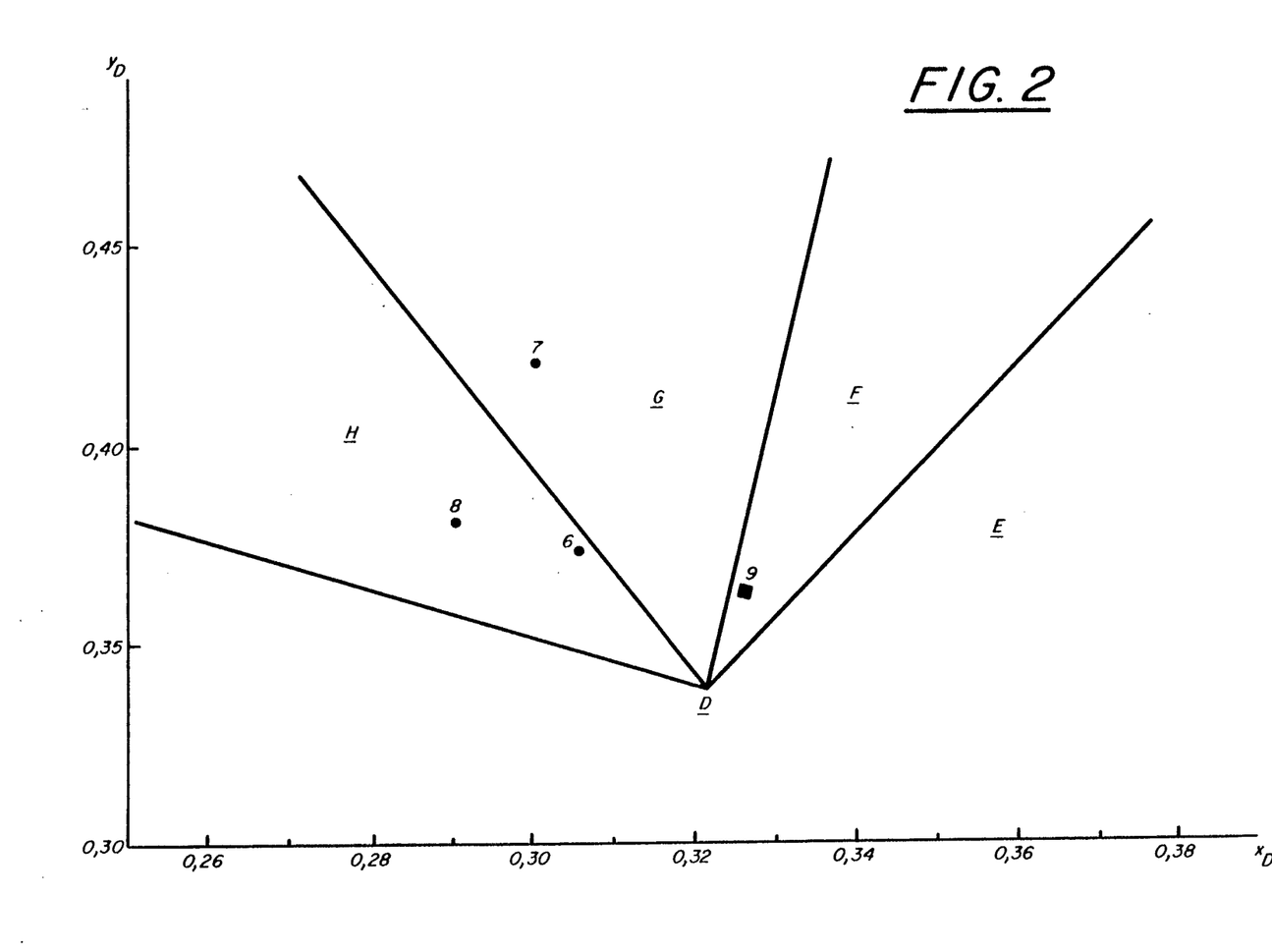
FIG. 2 is a graph plotting the measurement of color points of developing powders based on green pigments according to the invention and a powder according to the prior art.

It had a dull greenish appearance and the color point was as follows:
$X_D = 0.33$
$Y_D = 0.36$
$Z_D = 0.31$ The color points of the different green toners are shown in FIG. 2, in which zones E, F, G and H respectively correspond to the shades yellow, cream, bluish green and green.

EXAMPLE 23

This example illustrates a pretreatment of the mineral support.

Into a steel reactor equipped with an ULTRA-TURAX stirring system, 400 g of water and 50 g of magnetic iron oxide (gamma Fe$_2$O$_3$) were successively introduced. The pH of the mixture was adjusted to 9 by the addition of soda and then the iron oxide was dispersed by mechanical stirring for 30 minutes at 2000 r.p.m.

This was followed by the addition of 4.75 NiCl$_2$·6-H$_2$O and 15 g of triethanol amine. The mixture obtained was stirred for 30 minutes at 1000 r.p.m. The mixture was then filtered on a Büchner filter and washed with water. The recovered product was dried for 24 hours at 120° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A pigmentary colorant material, consisting essentially of a mineral core particulate, at least one mineral oxide and at least one dye, wherein the mineral oxide and dye are co-precipitated, said at least one mineral oxide being deposited onto the surface area of the core particulate, and said at least one dye being at least partly physically confined within a matrix of the mineral oxide.

2. The pigmentary colorant material as defined by claim 1, said at least one mineral oxide comprising an oxide, or hydrated oxide, of silicon, aluminum, titanium or zirconium.

3. The pigmentary colorant material as defined by claim 1, said mineral core particulates comprising a mineral oxide or hydroxide, a silicate, or a mineral carbonate, sulfate, sulfide or fluoride.

4. The pigmentary colorant material as defined by claim 3, said mineral core particulates comprising an oxide of titanium, aluminum, zinc, antimony, zirconium, cerium, lead or magnesium, or aluminum hydroxide.

5. The pigmentary colorant material as defined by claim 3, said mineral core particulates comprising a mica or kaolin-type silicate, an alkaline silicate, zinc, asbestos, talc or a silicoaluminate.

6. The pigmentary colorant material as defined by claim 3, said mineral core particulates comprising a carbonate of calcium, magnesium, barium or lead.

7. The pigmentary colorant material as defined by claim 3, said mineral core particulates comprising a sulfate of barium, calcium or lead.

8. The pigmentary colorant material as defined by claim 3, said mineral core particulates comprising zinc sulfide or lithopone.

9. The pigmentary colorant material as defined by claim 3, said mineral core particulates comprising calcium fluoride or a mixed fluoride of sodium and aluminum.

10. The pigmentary colorant material as defined by claim 1, said mineral core particulates comprising a magnetic metal, or oxide or complex thereof.

11. The pigmentary colorant material as defined by claim 10, said mineral core particulates comprising a ferrite or gamma $Fe_2O_3$.

12. The pigmentary colorant material as defined by claim 1, wherein the at least one dye: core particulates weight ratio is at most 0.1%.

13. The pigmentary colorant material as defined by claim 1, said at least one dye comprising a cationic or basic dye and the at least one mineral oxide comprising silica.

14. The pigmentary colorant material as defined by claim 1, said at least one dye comprising an anionic or acidic dye and the at least one mineral oxide comprising alumina.

15. The pigmentary colorant material as defined by claim 1, said mineral core particulates having been pretreated with a metal complex.

16. A process for the preparation of the pigmentary colorant material as defined by claim 1, comprising intimately contacting said mineral core particulates, a precursor of said at least one mineral oxide and the at least one dye in a reaction medium, next coprecipitating or crystallizing the oxide/dye therein, and then recovering the pigmentary colorant material from said reaction medium.

17. The process as defined by claim 16, said reaction medium comprising at least one dye, a silicate and an acid.

18. The process as defined by claim 16, said reaction medium comprising at least one dye, an aluminate and an acid.

19. The process as defined by claim 16, said reaction medium comprising at least one dye, an aluminum salt and a base.

20. The process as defined by any of claims 17, 18 or 19, comprising simultaneously introducing the acid or base, together with said silicate, aluminate or aluminum salt, into said reaction medium.

21. The process as defined by claim 16, wherein the pH of said reaction medium is maintained constant.

22. The process as defined by claim 16, comprising suspending said mineral core particulates in a solution of a silicate, aluminate or aluminum salt, and adding the at least one dye and either an acid or a base thereto.

23. The process as defined by claim 16, comprising aging said pigmentary colorant material upon preparation thereof.

24. The process as defined by claim 16, wherein said oxide precursor is produced by hydrolysis of an alkyl silicate.

25. The process as defined by claim 16, wherein said oxide precursor is produced by hydrolysis of an aluminum alkoxide.

26. The process as defined by claim 16, wherein said oxide precursor is produced by hydrolysis of a titanium (IV) salt.

27. The process as defined by claim 16, wherein said oxide precursor is produced by hydrolysis of an alkyl titanante.

28. The process as defined by claim 16, further comprising washing and drying said pigmentary colorant material recovered.

29. An electrostatic developer powder comprising the pigmentary colorant material as defined by claim 1.

30. The electrostatic developer powder as defined by claim 29, further comprising an added amount of titanium dioxide.

31. The pigmentary colorant material as defined by claim 1, further comprising a binder or filler material.

* * * * *